United States Patent
Zhu et al.

(10) Patent No.: US 9,821,512 B2
(45) Date of Patent: Nov. 21, 2017

(54) METHOD AND APPARATUS FOR DISPENSING REACTIVE TWO-PART SYSTEMS

(71) Applicant: Dow Global Technologies LLC, Midland, MI (US)

(72) Inventors: Huide D. Zhu, Rochester, MI (US); Lirong Zhou, Rochester Hills, MI (US); Michael C. Cocca, Westfield, IN (US); Andrew R. Kneisel, Clarkston, MI (US); Daniel P. Sophiea, Lake Orton, MI (US); Matthew B. Feldpausch, Waterford, MI (US); Gary L. Jialanella, Oxford, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/113,923

(22) PCT Filed: Mar. 25, 2015

(86) PCT No.: PCT/US2015/022625
§ 371 (c)(1),
(2) Date: Jul. 25, 2016

(87) PCT Pub. No.: WO2015/157006
PCT Pub. Date: Oct. 15, 2015

(65) Prior Publication Data
US 2017/0015052 A1  Jan. 19, 2017

Related U.S. Application Data

(60) Provisional application No. 61/977,668, filed on Apr. 10, 2014.

(51) Int. Cl.
*B29C 65/48* (2006.01)
*B60J 1/00* (2006.01)
(Continued)

(52) U.S. Cl.
CPC ........ *B29C 65/4805* (2013.01); *B05B 15/002* (2013.01); *B60J 1/006* (2013.01);
(Continued)

(58) Field of Classification Search
CPC .... B29C 65/4805; B05B 15/002; B60J 1/006; B60J 10/34
See application file for complete search history.

(56) References Cited

U.S. PATENT DOCUMENTS

| | | |
|---|---|---|
| 1,988,058 A | 1/1935 | Traller |
| 2,039,374 A | 5/1936 | Young |

(Continued)

FOREIGN PATENT DOCUMENTS

| | | |
|---|---|---|
| AU | 2012202087 | 11/2012 |
| DE | 29602751 | 5/1996 |

(Continued)

OTHER PUBLICATIONS

Craig Blum, Two-Component Adhesive Cartridge Systems, FAST, Jul. 2008.

(Continued)

*Primary Examiner* — Daniel Lee
(74) *Attorney, Agent, or Firm* — The Dobrusin Law Firm, P.C.; Norman L. Sims

(57) ABSTRACT

A two-component reactive dispensing system that is pliable is comprised of an outer sausage tubular member having therein an inner sausage tubular member in which the inner tubular member is bonded to the inner surface of the outer sausage tubular member longitudinally along a portion of the outer surface of the inner tubular sausage member. The compartments formed by the inner and outer tubular sausage members are filled with materials that are reactive with each other and the ends are sealed by gathering the ends and sealed using, for example wire wrap around clips.

19 Claims, 4 Drawing Sheets

(51) Int. Cl.

| | | |
|---|---|---|
| *B05B 15/00* | (2006.01) | |
| *B65B 29/10* | (2006.01) | |
| *B65D 35/22* | (2006.01) | |
| *B65D 81/32* | (2006.01) | |
| *E21D 20/02* | (2006.01) | |
| *B60J 10/34* | (2016.01) | |
| *B29L 31/10* | (2006.01) | |
| *B29L 31/30* | (2006.01) | |

(52) U.S. Cl.
CPC ............... *B60J 10/34* (2016.02); *B65B 29/10* (2013.01); *B65D 35/22* (2013.01); *B65D 81/3244* (2013.01); *B65D 81/3261* (2013.01); *B65D 81/3272* (2013.01); *E21D 20/026* (2013.01); *B29L 2031/10* (2013.01); *B29L 2031/30* (2013.01)

(56) References Cited

U.S. PATENT DOCUMENTS

| | | |
|---|---|---|
| 2,460,963 A | 2/1949 | Young |
| 2,493,063 A | 1/1950 | Frank et al. |
| 2,604,244 A | 7/1952 | Tripp |
| 2,735,149 A | 2/1956 | Frank |
| 2,820,735 A | 1/1958 | Amborski |
| 2,870,022 A | 1/1959 | Rossi |
| 3,149,447 A | 9/1964 | Dorr |
| RE25,869 E | 10/1965 | Schuermann |
| 3,302,410 A | 2/1967 | McLean |
| 3,324,621 A | 6/1967 | Runge |
| 3,382,641 A | 5/1968 | Jensen |
| 3,385,427 A | 5/1968 | Stouls |
| 3,432,980 A | 3/1969 | Seiferth et al. |
| 3,545,161 A | 12/1970 | Hoshino et al. |
| 3,740,306 A | 6/1973 | Kosbab et al. |
| 3,795,083 A | 3/1974 | Wells |
| 3,915,297 A | 10/1975 | Rausch |
| 4,009,778 A | 3/1977 | Howell |
| 4,126,005 A | 11/1978 | Coursen |
| 4,221,290 A | 9/1980 | Bast |
| 4,227,612 A | 10/1980 | Dillon |
| 4,233,341 A | 11/1980 | Hammer et al. |
| 4,913,553 A | 4/1990 | Falco |
| 5,161,715 A | 11/1992 | Giannuzzi |
| 5,480,067 A | 1/1996 | Sedlmeier |
| 6,129,244 A | 10/2000 | Horth |
| 8,313,006 B2 | 11/2012 | Willner et al. |
| 9,205,970 B2 | 12/2015 | Rahm et al. |
| 2013/0097968 A1 | 4/2013 | Willner et al. |

FOREIGN PATENT DOCUMENTS

| | | |
|---|---|---|
| EP | 0441538 | 8/1991 |
| EP | 2147870 | 1/2010 |
| WO | 2012084935 | 6/2012 |
| WO | 2013093061 | 6/2013 |

OTHER PUBLICATIONS

C-System 400 Industrial, Mixers for C System 400ml, MIXPAC System C400 brochure, Mixpac Inc. May 2008.

Mixpac Peeler II, The Clever 2-Component-Cartridge Elegantly Simple, brochure by Sulzer Chemtech, 2009.

METHOD AND APPARATUS FOR DISPENSING REACTIVE TWO-PART SYSTEMS

FIELD OF THE INVENTION

The invention relates to an improved two-component reactive dispensing system. In particular it is directed to a two-component system where one part of the reactive components is reactive with moisture. In particular, the invention relates to a dispensing system comprised of a pliable multi-compartment container filled with each of the reactive components.

BACKGROUND OF THE INVENTION

Two-component reactive systems are well known in the art and include epoxy and hardener systems available in any retail hardware store. Generally, two-component systems have employed two separate rigid tubes in which each material is dispensed by a separate plunger and mixed such as described by Craig Blum, Two Component Adhesive Cartridge Systems, *FAST*, July 2008. Unfortunately, such systems suffer from complexity and costly apparatus to utilize.

A modification of this general approach is one in which there is a rigid tube having a smaller tube disposed therein and a complex plunger diaphragm engaging both tubes to dispense the reactive system (Sulzer Chemtech, Mixpac Peeler II product Brochure). These systems also suffer from complexity and present problems dispensing highly viscous systems and sealing issues due to the complex diaphragms needed.

Pliable containers, typically referred to as a sausage container, have been used for packaging many differing kinds of products such as meat products, cookie dough and one-component caulk and the like. They are well known such as described in U.S. Pat. Nos. 1,988,058; 2,460,963; 2,493,063; 2,604,244; 2,735,149; 2,870,022; 3,795,083; 4,233,341; and 5,480,067.

Two-compartmented sausage containers separating two reactive components are also known and typically have been used in applications for anchoring bolts in drill holes for fastening strengthening members to roofs and walls in mine rock formations. Examples of such two-compartmented sausage containers include those described by U.S. Pat. Nos. 4,009,778; 4,126,005; and 4,227,612.

Two-component reactive systems using sausage containers, such as two separate sausage containers within a single dispensing device having separate chambers are known such as described by U.S. Pat. No. 6,129,244. Similarly, U.S. Pat. No. 8,313,006 describes a similar apparatus, but uses a two-compartmented sausage container in one of the chambers. In both of these, to ensure proper proportions and delivery of the dispensed components requires affixing of the ends to ensure good dispensing.

It would be desirable to provide a two-component reactive system that may use conventional single component sausage dispensing guns without any complex affixing while still achieving long shelf life when at least one of the components is reactive with water.

SUMMARY OF THE INVENTION

A first aspect of the invention is an improved two-component reactive dispensing system comprising, (i) a first tubular member having walls comprised of a pliable film in which the walls define a first compartment having an inner wall surface, outer wall surface, two ends, longitudinal axis and cross-sectional area and (ii) a second tubular member having walls comprised of a pliable film in which the walls define a second compartment having an inner wall surface, outer wall surface, longitudinal axis, two ends, and cross-sectional area, wherein the second tubular member is disposed within the first tubular member along the longitudinal axis of each, and a portion of the outer wall surface of the second tubular member is bonded to a portion of the inner wall surface of the first tubular member along the longitudinal axis, and (iii) the first and second compartments being filled with differing reactive materials that react with each other and at least one of the reactive materials reacts with water and the first and second compartments are cooperatively gathered and sealed at each end.

A second aspect of the invention is a method of adhering a transparent substrate into a building or vehicle comprising, (a) providing the two-component reactive dispensing system of the first aspect of the invention, (b) unsealing one end of the two-component reactive system, (c) dispensing the reactive materials of the two-component system onto the transparent substrate to form a bead of the reactive materials on the transparent substrate, (d) contacting the transparent substrate with the building or vehicle such that the adhesive bead is there between and in contact with the transparent substrate and the building or vehicle, and (e) allowing the reactive materials to react and adhere the transparent substrate to the building or vehicle.

The improved component reactive dispensing system may be used in any application that requires the controlled curing of reactive systems such as adhesives for bonding two substrates together or other applications such as described above. The improved component dispensing system, however, has been found to be particularly useful for dispensing from standard battery driven single chamber caulking guns for adhering glass into vehicles. This is so even though the reactive materials may have a high viscosity.

DETAILED DESCRIPTION OF THE INVENTION

Figure 1:
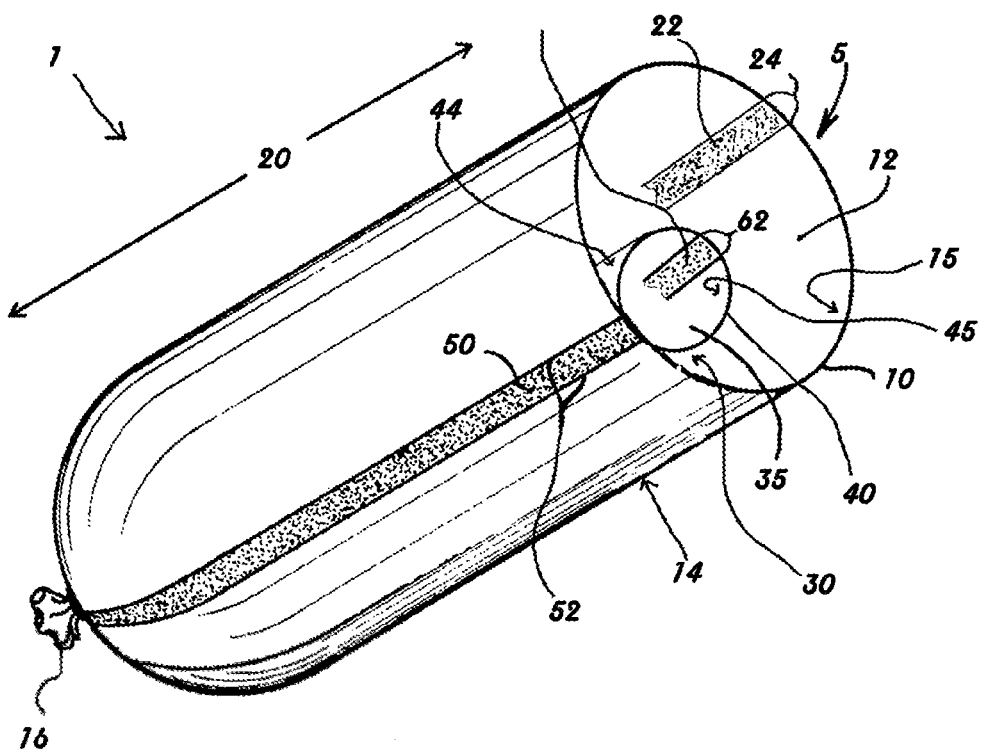
FIG. 1 is a perspective depiction of the two-component reactive dispensing system of this invention prior to being filled with the reactive materials.

The two-component reactive dispensing system is comprised of first and second tubular members that are comprised of a pliable film. The pliable film may be the same or different, so long as the film is essentially impermeable to water. Essentially impermeable to water means that any reactive material disposed within the two-component reactive dispensing system will not react to any great extent so that the shelf life of the two-component reactive dispensing system is at least 6 months.

Generally, permeability to water means that the moisture vapor transmission rate (MVTR) is at most 0.02 grams/100 in$^2$/day and desirably is at most 0.01 or essentially no transmission (not measurable, which is less than about 0.06 grams/100 in$^2$/day). The MVTR may be determined by known standards for determining it for sheet materials such as ASTM E398.

The pliable film of the tubular members is understood to be subjectively flexible enough to be easily dispensed when using a battery powered caulking gun, described below. Generally, it means the films are easily manipulated by hand. Generally, this means the film is at most about 500 micrometers thick. Typically, the films have a thickness of at most about 400, 300, 200, 150 or 100 micrometers to at least about 10, 20, 30, 50 micrometers or a thickness sufficient to provide the desired impermeability.

The pliable film may be any plastic or metal film that realizes the desired permeability and pliability. Generally, to facilitate the construction of the tubular members and sealing of the reactive dispensing system a laminate of a metal and an organic polymer ("polymer") may be used. The laminate of a metal and polymer may contain two or more layers. The polymer maybe any that realizes the desired properties and include, for example, a polyolefin (e.g., polyethylene, polypropylene or copolymers of polyethylene or polypropylene), cellophane, vinyl polymers (e.g., polyvinyl chlorides), and polymeric linear terephthalate esters (e.g., polyethylene terephthalate "PET"). Preferably, the polymer is polyethylene terephthalate, polyethylene or polypropylene. More preferably, the polymer is a biaxially oriented polymer such as a biaxially oriented polypropylene or PET and most preferably it is a biaxially oriented polypropylene.

The metal may be any metal foil such as aluminum, silver, gold, copper, but is preferably aluminum.

A preferred pliable film is a laminate comprised of three layers with two outer layers sandwiching an inner layer. The outer layers are desirably comprised of a polymer (e.g., the biaxially oriented polypropylene) and the inner layer comprised of a metal (e.g., aluminum) that is essentially impermeable to water vapor. The inner layer of metal, typically has a thickness from about 10 micrometers to about 30 micrometers. The outer layers of polymer, typically have a thickness of about 10 to 50, 40 or 30 micrometers. These types of films are commercially available from companies such as Constantia Ebert GmbH, Weisbaden, Germany and Flex Films Ltd., Elizabeth Town, Ky.

Figure 2:
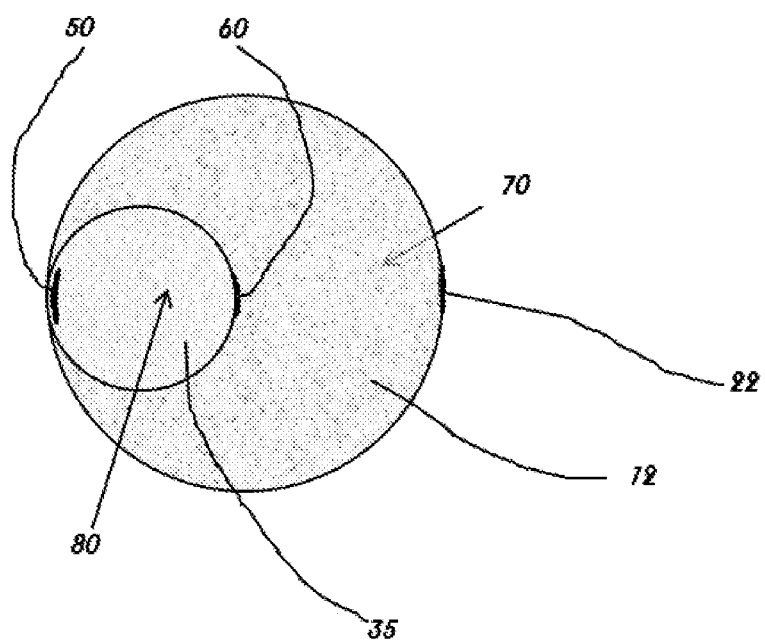
FIG. 2 is a cross-sectional depiction of the two-component dispensing system including the reactive material
Figure 3:
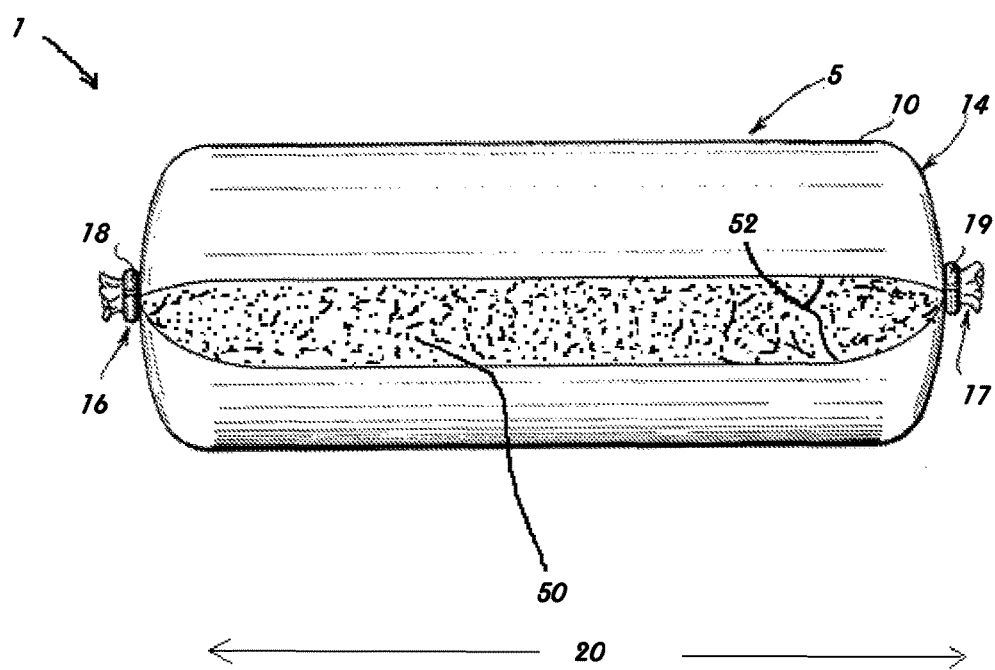
FIG. 3 is an outer longitudinal perspective of the two-component dispensing system.

An illustrative embodiment of the reactive two-component dispensing system 1 is shown in FIGS. 1 to 3. The first tubular member maybe formed from a sheet of film that is then bonded at an end by an adhesive or by fusing the film to itself such as by welding to form the cylindrical shape (i.e., tube). Alternatively the sheet may be extruded or blown without having a bonding line. In a particular embodiment the biaxially oriented film has a direction of a highest tensile strength that is parallel to the longitudinal axis of the tubular member.

In the illustrative embodiment depicted in FIGS. 1 to 3, the outer tubular member 5 has wall 10 that defines a first compartment 12 outer and inner wall surfaces 14 and 15, ends 16 and 17 gathered by clips 18 and 19 and having longitudinal axis 20. The outer tubular member has a bond line 22 having bond width of 24 indicating it was made from a sheet of pliable film bonded to itself through the outer and inner wall surfaces 14 and 15. The bond may be formed by any suitable method such as using an adhesive or fusing by the application of heat or solvent. Preferably, the bonding is performed by fusing a thermoplastic polymer by the application of heat.

The bond width of the bond line forming the tubular member or bonding the inner tubular member with outer tubular member, needs to be wide enough so that the permeability to water is sufficiently small that the shelf life necessary is realized and also the bond does not delaminate upon dispensing. Generally, the bond width is at least 2 to about 20 mm. Typically, the bond width is at least 3, 4 or 5 mm to 15 or 10 mm.

The illustrative embodiment of the dispensing system 1 of FIGS. 1 to 3 has an inner tubular member 30 having wall 35 comprised of a pliable film in which the wall 35 defines a second compartment 40 having an outer wall surface 44, inner wall surface 45, wherein the inner tubular member is disposed within the outer tubular member along the longitudinal axis 20, and a portion of the outer surface 44 of the inner tubular member 30 is bonded to a portion of the inner surface 15 of the first tubular member 5 parallel to the longitudinal axis 20 along bond line 50 having a bond width 52. The inner tubular member 30 has a bond line 60 having bond width of 62 indicating it was also made from a sheet of pliable film bonded to itself through the outer and inner wall surfaces 44 and 45.

When using tubular members formed from a pliable sheet bonded to itself, it has been discovered that to ensure uniform mixing and formation of uniform beads of the reactive mixture upon dispensing the two-component reactive mixtures the bond lines along the longitudinal axis of the tubular members must not coincide with the bond line bonding the inner and outer tubular members together as shown in FIG. 1. Likewise, no bond line should bond more than two plies of the film (i.e., two wall thicknesses of the film) otherwise there is tendency for separation to occur during handling and dispensing detrimentally affecting shelf life and dispensing homogeneity.

It is preferred that each tubular bond line is disposed as far as possible from the bond line bonding the inner tubular member to the outer tubular member. Generally, this means that the bond line adhering the inner and outer tubular members is displaced 180$^\pm$30 degrees from the bond line forming each tubular element. Preferably the angle of displacement is about 180$^\pm$20 degrees and more preferably is about 180$^\pm$10 degrees.

The outer tubular member and inner tubular member each contain a volume of reactive material given by the length of each tubular member and its cross-sectional area. It has also been discovered that the inner tubular element must have sufficient volume (i.e., occupy a cross-sectional area of a portion of the outer tubular element) otherwise inhomogeneous dispensing tends to occur because of bunching of the inner tubular member. Generally, the inner tubular member occupies at least 5% to at most about 50% of the cross-sectional area of the outer tubular member. Desirably, the inner tubular member occupies at least 10%, 15% or 20% to at most about 45%, 40% or 35%. In a preferred embodiment, the inner tubular member occupies about 25% of the outer tubular member cross-sectional area.

The two-component reactive dispensing system may be used to dispense any two-component reactive system where one of the reactive materials reacts with water. However, it is particularly suited to dispensing two-component reactive systems having high viscosities. Generally high viscosity means that the viscosity of at least one of the reactive materials is at least about 10,000, 20,000, or 30,000 centipoise to about 2,000,000 or 1,000,000 centipoise. It is also preferred that both reactive materials have viscosities that are within about 50% of each other under the same shear strain rate close to the strain rate expected to be used to dispense the reactive materials. Near means the strain rate is ±50% of the strain rate typically used to dispense the reactive materials. It is even more preferred if the viscosity is within 40%.

A useful indicative viscosity measurement is one in which the viscosity is measured using a Brookfield viscometer using a number 5 spindle at the lowest rpm or using a AR2000 Rheometer available from TA Instruments, New Castle, Del. with a continuous flow method where a 4 degree cone plate of 20 mm diameter is used at 25 degree C. along with 152 micrometer gap and a shear sweep from 1 to 150 second$^{-1}$. The viscosity in centipoise is taken at a shear rate of 5 second$^{-1}$.

The two-component reactive dispensing system is comprised of differing reactive materials in the first compartment and second compartment, wherein one of the reactive materials is reactive with water. Illustratively, the reactive material 70 occupying the first compartment 12 is reactive material comprised of an isocyanate terminated prepolymer useful as an adhesive.

The isocyanate terminated based prepolymers are present in sufficient quantity to provide adhesive character to the composition. Such prepolymers have an average isocyanate functionality sufficient to allow the preparation of a crosslinked polyurethane upon cure and not so high that the polymers are unstable. "Stability" in this context means that the prepolymer or adhesive prepared from the prepolymer has a shelf life of at least three months at ambient temperature, in that it does not demonstrate an increase in viscosity during such period which prevents its dispensing, application or use. For example, the viscosity should not rise too greatly to make it impractical to dispense the reactive material. Preferably, the reactive material 70 does not undergo an increase in viscosity of more than about 50 percent during the stated period.

The prepolymer of the reactive material 70 desirably has a total NCO content which facilitates acceptable strength in adhesives prepared from the prepolymers after 60 minutes and stability of the prepolymer. Total NCO content includes the NCOs from the isocyanate terminated prepolymer or unreacted isocyanates used to make the prepolymers. Preferably, the NCO content is about 0.6 percent by weight or greater based on the weight of the prepolymer and more preferably about 0.9 percent by weight or greater, and preferably about 4.0 percent by weight or less, more preferably about 3.5 percent by weight or less, even more preferably about 3.0 percent by weight or less, and even more preferably about 2.6 percent by weight or less. If the prepolymer has greater than about 4.0 percent by weight, the dispensed reactive materials when used as an adhesive may demonstrate lap shear strengths after 60 minutes that may be too low for the intended use. Below about 0.6 percent by weight, the prepolymer viscosity may be too high to handle and the working time may be too short even if dispensable.

Preferable polyisocyanates for use in preparing the prepolymer include those disclosed in U.S. Pat. No. 5,922,809 at col. 3, line 32 to column 4, line 24, incorporated herein by reference. Preferably, the polyisocyanate is an aromatic or cycloaliphatic polyisocyanate such as diphenylmethane-4, 4'-diisocyanate, isophorone diisocyanate, tetramethylxylene diisocyanate, and is most preferably diphenylmethane-4,4'-diisocyanate. The diols and triols are generically referred to as polyols.

The prepolymers are made from polyols such as diols and triols such as those described in U.S. Pat. No. 5,922,809 at column 4, line 60 to column 5, line 50, incorporated herein by reference. The polyols (diols and triols) are polyether polyols and more preferably polyoxyalkylene oxide polyols. The most preferred triols are ethylene oxide-capped polyols prepared by reacting glycerin with propylene oxide, followed by reacting the product with ethylene oxide.

Preferably, the polyether is chosen to decrease the polarity of the prepolymer. A significant factor in determining the polarity of the prepolymer is the amount of ethylene oxide units in the polyether used to prepare the prepolymer. Preferably, the ethylene oxide content in the prepolymer is about 3 percent by weight or less, more preferably about 1.2 percent by weight or less and most preferably about 0.8 percent by weight or less. As used herein "polarity" refers to the impact of the presence of polar groups in the backbone of the prepolymer. It is also understood that a small amount of other polyols may be used to form the polyether prepolymer such as a polyester polyol such as those known in the art. Typically, such other polyols may be present in an amount of about up to 5% by weight of the polyols used to make said prepolymer. However, said prepolymer may be made in the absence of such polyols.

Generally the reactive material 70 having the prepolymer includes a filler such as a carbon black. The carbon blacks depending on their structure and the molecular weight of the prepolymers may range over a wide range of structures as given by oil absorption number (ASTM D-2414-09). For example, the carbon black typically desirably has an oil absorption number (OAN) of about 80 to 200 ccs per 100 grams, when the Mz of the prepolymer is about 65,000. Preferably, the oil absorption of the carbon is at least about 90, more preferably at least about 100, and most preferably at least about 110 to preferably at most about 180, more preferably at most about 165 and most preferably at most about 150 ccs/100 grams.

The amount of carbon black suitable may be determined for a given carbon black and prepolymer Mz, by routine experimentation. Typically, the amount of carbon black is at least in ascending desirability, 10%, 15%, 18%, 23% or 25% to at most, in ascending desirability, 38%, 35%, 32%, 30% or 28% by weight of the adhesive composition.

The carbon black used may be a standard carbon black which is not specifically treated to render it nonconductive. Standard carbon black is carbon black which is not specifically surface treated or oxidized. Alternatively, one or more nonconductive carbon blacks may be used exclusively or in conjunction with the standard carbon black. Suitable standard carbon blacks include RAVEN™ 790, RAVEN™ 450, RAVEN™ 500, RAVEN™ 430, RAVEN™ 420 and RAVEN™ 410 carbon blacks available from Colombian and CSX carbon blacks such as ELFTEX S5100 and S7100 and MONARCH 120, 570, and 590 available from Cabot, and PRINTEX™ 30 carbon black available from Evonik Industries, Mobile, Ala. Suitable non-conductive carbon blacks include RAVEN™ 1040 and RAVEN™ 1060 carbon black available from Colombian Chemicals Company, Marietta, Ga.

The reactive material 70 may also be comprised of reactive silicon. The reactive silicon may be present as a separate molecule such as a silane. It may be present within the backbone or as a terminal group in the prepolymer described above. The reactive silicon, generally is one that can undergo hydrolysis such as described at column 4, lines 25 to 55 of U.S. Pat. No. 6,613,816. Other illustrative reactive silicons may be found in U.S. Patent Publication 2002/0100550 paragraphs 0055 to 0065 and Hsieh, U.S. Pat. No. 6,015,475, column 5, line 27 to column 6, line 41, incorporated herein by reference.

The amount of reactive silicon, when present in the reactive material 70 is, generally, about 0.001% to 2% by weight of the total weight of the reactive materials 70 and 80 in both compartments. The amount of the reactive silicon (note, the weight of the silicon itself and does not include, for example, the organic groups appended thereto), may be at least 0.005%, 0.01%, 0.02%, 0.04%, 0.06%, 0.08% or 0.1% to at most 1.8%, 1.6%, 1.4%, 1.2%, 1%, 0.8%, 0.5% of the reactive materials 70 and 80.

The reactive material 70 may also be comprised of one or more organic based polymers dispersed therein. Preferably, the organic based polymer is included in the prepolymer by inclusion of a dispersion triol having dispersed therein particles of an organic based polymer. Dispersion triols typically are understood to have at least a portion of the particles being grafted with the polyol. The preferable dispersion triols are disclosed in Zhou, U.S. Pat. No. 6,709, 539 at column 4, line 13 to column 6, line 18, incorporated herein by reference. Preferably, the triol used to disperse the organic particles is a polyether triol and more preferably a polyoxyalkylene based triol. Preferably, such polyoxyalkylene oxide triol comprises a polyoxypropylene chain with a polyoxyethylene end cap. Preferably, the triols used have a molecular weight of about 4,000 or greater, more preferably about 5,000 or greater and most preferably about 6,000 or greater. Preferably, such triol has molecular weight of about 8,000 or less and more preferably about 7,000 or less. It is understood that the polyol of the dispersion polyol (e.g., triol) is included in the polyol to make the prepolymer composition described herein, where the copolymer particles of the dispersion polyol are understood to be fillers in the composition.

Preferably, the particles dispersed in the dispersion triol comprise a thermoplastic polymer, rubber-modified thermoplastic polymer or a polyurea dispersed in a triol. The polyurea preferably comprises the reaction product of a polyamine and a polyisocyanate. Preferable thermoplastic polymers are those based on monovinylidene aromatic monomers and copolymers of monovinylidene aromatic monomers with conjugated dienes, acrylates, methacrylates, unsaturated nitriles or mixtures thereof. The copolymers can be block or random copolymers. More preferably, the particles dispersed in the triol comprise copolymers of unsaturated nitriles, conjugated dienes and a monovinylidene aromatic monomer, a copolymer of an unsaturated nitrile and a monovinylidene aromatic monomer or a polyurea. Even more preferably, the particles comprise a polyurea or polystyrene-acrylonitrile copolymer with the polystyrene-acrylonitrile copolymers being most preferred. The organic polymer particles dispersed in the triol preferably have a particle size which is large enough to improve the impact properties and elastomeric properties of the finally cured adhesive, but not so large so as to reduce the ultimate strength of the adhesive after cure. The particles may be dispersed in the triol or grafted to the backbone to at least a portion of the triols if not all of them. Preferably, the particle size is about 10 microns or greater and more preferably the particle size is about 20 microns or greater.

Preferably, the particle size is about 50 microns or less and more preferably the particle size is about 40 microns or less. The triol dispersion contains a sufficient amount of organic polymer particles such that the adhesive upon cure has sufficient hardness for the desired use and not so much such that the cured adhesive has too much elasticity as defined by elongation. Preferably, the dispersion contains about 20 percent by weight or greater of organic polymer particles copolymer based on the dispersion, preferably about 30 percent by weight or greater and more preferably about 35 percent by weight or greater. Preferably, the dispersion contains about 60 percent by weight or less of organic polymer particles based on the dispersion, preferably about 50 percent by weight or less and more preferably about 45 percent by weight or less.

The polyols are present in an amount sufficient to react with most of the isocyanate groups of the isocyanates leaving enough isocyanate groups to correspond with the desired free isocyanate content of the prepolymer. Preferably, the polyols are present in an amount of about 30 percent by weight or greater based on the prepolymer, more preferably about 40 percent by weight or greater and most preferably about 55 percent by weight or greater. Preferably, the polyols are present in an amount of about 75 percent by weight or less based on the prepolymer, more preferably about 65 percent by weight or less and most preferably about 60 percent by weight or less.

Generally, the reactive material 70 typically has a ratio of diols to triols and dispersion triols to achieve the desired cure rate and strength of the adhesive. The weight ratio of diol to triol and dispersion triol, if present, is preferably about 0.8 or greater and more preferably about 0.85 or greater and most preferably about 0.9 or greater. The weight ratio of diol to triol and dispersion triol, if present, is preferably about 3.0 or less; more preferably about 2.0 or less and most preferably about 1.75 or less. In the embodiment where the polyols comprise a mixture of diols and triols, the amount of diols present is preferably about 15 percent by weight or greater based on the prepolymer, more preferably about 25 percent by weight or greater and most preferably about 28 percent by weight or greater; and about 40 percent by weight or less based on the prepolymer, more preferably about 35 percent by weight or less and most preferably about 30 percent by weight or less. In the embodiment where the polyols comprise a mixture of diols and triols, the total amount of triols (non dispersion triol and dispersion triol) present is preferably about 15 percent by weight or greater based on the prepolymer, more preferably about 18 percent by weight or greater and most preferably about 20 percent by weight or greater; and preferably about 45 percent by weight or less based on the prepolymer, more preferably about 35 percent by weight or less and most preferably about 32 percent by weight or less.

The dispersion of organic polymer particles in a triol may be present in the prepolymer in an amount of about 10 percent by weight or greater of the prepolymer and more preferably about 12 percent by weight or greater, and about 18 percent by weight or less of the prepolymer and more preferably about 15 percent by weight or less.

The prepolymers may be prepared by any suitable method, such as bulk polymerization and solution polymerization. The reaction to prepare the prepolymer is carried out under anhydrous conditions, preferably under an inert atmosphere such as a nitrogen blanket and to prevent crosslinking of the isocyanate groups by atmospheric moisture. The reaction is preferably carried out at a temperature between about 0° C. and about 150° C., more preferably between about 25° C. and about 90° C., until the residual isocyanate content determined by titration of a sample is very close to the desired theoretical value. "Isocyanate content" means the weight percentage of isocyanate moieties to the total weight of the prepolymer. The reactions to prepare the prepolymer may be carried out in the presence of urethane catalysts. Examples of such include the stannous salts of carboxylic acids, such as stannous octoate, stannous oleate, stannous acetate, and stannous laurate. Also, dialkyltin dicarboxylates such as dibutyltin dilaurate and dibutyltin diacetate are known in the art as urethane catalysts, as are tertiary amines and tin mercaptides. Preferably, the reaction to prepare the prepolymer is catalyzed by stannous octoate. The amount of catalyst employed is generally between about 0.005 and about 5 parts by weight of the mixture catalyzed, depending on the nature of the isocyanate. Preferably, the reaction is carried out in admixture with a plasticizer.

The polyurethane prepolymers useful as the reactive material 70 may further comprise a plasticizer. The plasticizers may be used so as to modify the rheological properties to a desired consistency. Such materials should be free of water, inert to isocyanate groups. The plasticizers may be common plasticizers useful in polyurethane adhesive applications and well known to those skilled in the art and are referred to hereinafter as low polar plasticizers. The plasticizer is present in an amount sufficient to disperse the prepolymer of reactive material 70. The plasticizer can be added to the prepolymer either during preparation of the prepolymer or during compounding of the prepolymer prior to being placed into the first compartment. Preferably, the plasticizer is present in about 1 percent by weight or greater of the prepolymer formulation (prepolymer plus plasticizer), more preferably about 20 percent by weight or greater and most preferably about 30 percent by weight or greater. Preferably, the plasticizer is present in about 45 percent by weight or less of the prepolymer formulation and more preferably about 35 percent by weight or less.

Preferably two plasticizers are used, with one being a high polar plasticizer and one being a low polar plasticizer. A high polar plasticizer is a plasticizer with a polarity greater than the polarity of the aromatic diesters, such as the phthalate esters. A low polar plasticizer is a plasticizer which has a polarity the same as or less than the aromatic diesters.

Suitable high polar plasticizers include one or more of alkyl esters of sulfonic acid, alkyl alkylethers diesters, polyester resins, polyglycol diesters, polymeric polyesters, tricarboxylic esters, dialkylether diesters, dialkylether aromatic esters, aromatic phosphate esters, and aromatic sulfonamides. More preferred high polar plasticizers include aromatic sulfonamides, aromatic phosphate esters, dialkyl ether aromatic esters and alkyl esters of sulfonic acid. Most preferred high polar plasticizers include alkyl esters of sulfonic acid and toluene-sulfamide. Alkyl esters of sulfonic acid include alkylsulphonic phenyl ester available from Lanxess under the trademark MESAMOLL. Aromatic phosphate esters include PHOSFLEX™ 31 L isopropylated triphenyl phosphate ester, DISFLAMOLL™ DPO diphenyl-2-ethyl hexyl phosphate, and DISFLAMOL™ TKP tricresyl phosphate. Dialkylether aromatic esters include BENZOFLE™ 2-45 diethylene glycol dibenzoate. Aromatic sulfonamides include KETJENFLE™ 8 o and p, N-ethyl toluenesulfonamide.

Suitable low polar plasticizers include one or more aromatic diesters, aromatic triesters, aliphatic diesters, epoxidized esters, epoxidized oils, chlorinated hydrocarbons, aromatic oils, alkylether monoesters, naphthenic oils, alkyl monoesters, glyceride oils, paraffinic oils and silicone oils. Preferred low polar plasticizers include alkyl phthalates, such as diisononyl phthalates, dioctylphthalate and dibutylphthalate, partially hydrogenated terpene commercially available as "HB-40", epoxy plasticizers, chloroparaffins, adipic acid esters, castor oil, toluene and alkyl naphthalenes. The most preferred low polar plasticizers are the alkyl phthalates.

The amount of low polar plasticizer in the adhesive composition is that amount which gives the desired rheological properties and which is sufficient to disperse the catalyst in the system. The amounts disclosed herein include those amounts added during preparation of the prepolymer and during compounding of the adhesive. Preferably, low polar plasticizers are used in an amount of about 5 parts by weight or greater based on the weight of reactive material 70, more preferably about 10 parts by weight or greater, and most preferably about 18 parts by weight or greater. The low polar plasticizer is preferably used in an amount of about 40 parts by weight or less based on the total amount of reactive material 70, more preferably about 30 parts by weight or less and most preferably about 25 parts by weight or less.

The amount of high polar plasticizer in reactive material 70 is that amount which gives the desired rheological properties and the acceptable sag and string properties of the dispensed reactive materials. Preferably, the high polar plasticizers are used in the reactive material 70 in an amount of about 0.2 parts by weight or greater based on the weight of reactive material 70, more preferably about 0.5 parts by weight or greater, and most preferably about 1 part by weight or greater. The high polar plasticizer is preferably used in an amount of about 20 parts by weight or less based on the total amount of the adhesive composition, more preferably about 12 parts by weight or less and most preferably about 8 parts by weight or less.

The prepolymer of reactive material 70 may be prepared by any suitable method, such as by reacting polyols, such as diols, triols and optionally dispersion triols such as a copolymer polyol or grafted triol, with an excess over stoichiometry of one or more polyisocyanates under reaction conditions sufficient to form a prepolymer having isocyanate functionality and free isocyanate content which meets the criteria discussed above. In a preferable method used to prepare the prepolymer, the polyisocyanates are reacted with one or more diols, one or more triols and, optionally, one or more dispersion triols. Preferable processes for the preparation of the prepolymers are disclosed in U.S. Pat. No. 5,922,809 at column 9, lines 4 to 51, incorporated herein by reference. The polyurethane prepolymers are present in an amount sufficient such that when the resulting dispensed reactive material 70 and 80 are dispensed and cure, substrates are bound together. Preferably, the polyurethane prepolymers are present in an amount of about 20 parts by weight of the reactive material 70 or greater, more preferably about 30 parts by weight or greater and most preferably about 35 parts by weight or greater. Preferably, the polyurethane prepolymers are present in an amount of about 60 parts by weight or less of the reactive material 70, more preferably about 50 parts by weight or less and even more preferably about 45 parts by weight or less.

Reactive material 70 may further comprise a polyfunctional isocyanate, for example, may improve the modulus of the composition in the cured form or adhesion of the adhesion composition to particular substrates such as painted substrates. "Polyfunctional" as used in the context of the isocyanates refers to isocyanates having a functionality of 2 or greater. The polyisocyanates can be any monomeric, oligomeric or polymeric isocyanate having a nominal functionality of about 2.5 or greater. More preferably, the polyfunctional isocyanate has a nominal functionality of about 2.7 or greater. Preferably, the polyfunctional isocyanate has a nominal functionality of about 5 or less, even more preferably about 4.5 or less and most preferably about 3.5 or less. The polyfunctional isocyanate can be any isocyanate which is reactive with the isocyanate polyisocyanate prepolymers used in the composition and which improves the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300 and N100, and polymeric isocyanates such as polymeric MDI (methylene diphenyl diisocyanates) such as those marketed by The Dow Chemical Company under the trademark of PAPI, including PAPI 20 polymeric isocyanate. The polyfunctional isocyanates, when present are typically present in an amount sufficient to impact the modulus of the cured compositions of the invention or improve the adhesion to certain substrates described above. The polyfunctional isocyanate, when present, is preferably present in an amount of about 0.5 parts by weight or greater based on the weight of the adhesive composition, more preferably about 1.0 parts by weight or greater and most preferably about 2 parts by weight or greater. The polyfunctional isocyanate is preferably present in an amount of about 8 parts by weight or less, based on the weight of the adhesive composition, more preferably about 5 parts by weight or less and most preferably about 4 parts by weight or less.

Reactive material 70 may also contain a catalyst which catalyzes the reaction of isocyanate moieties with water or an active hydrogen containing compound, which may be in reactive material 80. Such compounds are well known in the art. The catalyst can be any catalyst known to the skilled artisan for the reaction of isocyanate moieties with water or active hydrogen containing compounds. Among preferred catalysts are organotin compounds, metal alkanoates, and tertiary amines. Mixtures of classes of catalysts may be used. A mixture of a tertiary amine and a metal salt is preferred. Even more preferred are tertiary amines, such as dimorpholino diethyl ether, and a metal alkanoate, such as bismuth octoate. Included in the useful catalysts are organotin compounds such as alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. Dialkyltin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organotin or metal alkanoate catalyst is present in an amount of about 60 parts per million or greater based on the weight of the adhesive, more preferably 120 parts by million or greater. The organotin catalyst is present in an amount of about 1.0 percent or less based on the weight of the reactive material 70, more preferably 0.5 percent by weight or less and most preferably 0.1 percent by weight or less.

Useful tertiary amine catalysts include dimorpholinodialkyl ether, a di((dialkylmorpholino)alkyl) ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methyl-morpholine, N-ethyl morpholine and mixtures thereof. A preferred dimorpholinodialkyl ether is dimorpholinodiethyl ether. A preferred di((dialkylmorpholino)alkyl) ether is (di-(2-(3,5-dimethylmorpholino)ethyl)ether). Tertiary amines are preferably employed in an amount, based on the weight of the adhesive of about 0.01 parts by weight or greater, more preferably about 0.05 parts by weight or greater, even more preferably about 0.1 parts by weight or greater and most preferably about 0.2 parts by weight or greater and about 2.0 parts by weight or less, more preferably about 1.75 parts by weight or less, even more preferably about 1.0 parts by weight or less and most preferably about 0.4 parts by weight or less.

Reactive material 70 may be formulated with fillers other than the carbon black and additives known in the prior art for use in adhesive compositions. By the addition of such materials, physical properties such as viscosity flow rates and the like can be modified. However, to prevent premature hydrolysis of the moisture sensitive groups of the polyurethane prepolymer, fillers should be thoroughly dried before admixture therewith.

Optional components of reactive material 70 include reinforcing fillers. Such fillers may include those known in the art and including, for example, titanium dioxide, calcium carbonate, surface treated silicas, titanium oxide, fumed silica, talc, and the like. In one embodiment, more than one reinforcing filler may be used. The reinforcing fillers are typically used in an amount sufficient to increase the strength of the adhesive.

Optional fillers may include clays. Preferred clays include kaolin, surface treated kaolin, calcined kaolin, aluminum silicates and surface treated anhydrous aluminum silicates. The clays can be used in any form, which facilitates formulation of a dispensable reactive material 70. Preferably, the clay is in the form of pulverized powder, spray-dried beads or finely ground particles. Clays may be used in an amount of about 0.1 parts by weight of the adhesive composition or greater, more preferably about 12 parts by weight or greater and even more preferably about 18 parts by weight or greater. Preferably, the clays are used in an amount of about 30 parts by weight or less of the adhesive composition, more preferably about 28 parts by weight or less and most preferably about 24 parts by weight or less.

Reactive material 70 may further comprise stabilizers, which function to protect the prepolymer from moisture, thereby inhibiting advancement and preventing premature crosslinking of the isocyanates in the reactive material 70. Stabilizers known to the skilled artisan for moisture curing adhesives may be used. Included among such stabilizers are diethylmalonate, alkylphenol alkylates, paratoluene sulfonic isocyanates, benzoyl chloride and orthoalkyl formates. Such stabilizers are preferably used in an amount of about 0.1 parts by weight or greater based on the total weight of the reactive material 70, preferably about 0.5 parts by weight or greater and more preferably about 0.8 parts by weight or greater. Such stabilizers are used in an amount of about 5.0 parts by weight or less based on the weight of the adhesive composition, more preferably about 2.0 parts by weight or less and most preferably about 1.4 parts by weight or less.

The reactive material 80 in the second compartment 35 may be any that reacts the reactive material 70 such as those containing reactive hydrogens such as the polyols described above or water.

In one embodiment, the reactive material 80 is a paste containing water. A paste containing water is present to speed up the cure of the reactive material 70 that is moisture curable (i.e., reacts with water) and is particularly useful as an adhesive. The use of such a paste is particularly useful when the reactive materials 70 and 80 are dispensed at low temperature and/or low relative humidity. Low temperatures generally mean less than ambient 25° C., but more typically less than 15° C. Low humidity generally means less than 50 percent relative humidity, but more typically less than 35 percent relative humidity.

Generally the paste is comprised of water, a liquid carrier and a paste forming agent. The paste is preferably homogeneous. The liquid carrier may be any liquid that facilitates the formation of a stable homogeneous paste with water and the paste forming agent. The liquid carrier likewise should be selected so that it does not affect the properties of the cured reactive materials 70 and 80 after dispensing.

Desirably, the liquid carrier contains isocyanate reactive groups and participates in the cure of the isocyanate prepolymer of reactive material 70. Preferably, the liquid carrier comprises one or more glycol ethers, polyether polyols, polyamines and polyether amines. More preferably, the liquid carrier one or more glycol ethers and polyether polyols, and most preferably one or more polyether polyols. Preferred polyether polyols are described herein with respect to isocyanate reactive compounds.

The liquid carrier is present in sufficient amount to form a paste and preferably a homogeneous paste. Preferably the liquid carrier is present in an amount of about 40 weight percent or greater based on the weight of the cure accelerator, more preferably about 45 weight percent by weight or greater and most preferably about 50 weight percent or greater. Preferably the liquid carrier is present in an amount of about 70 weight percent or less based on the weight of the cure accelerator, more preferably about 65 weight percent by weight or less and most preferably about 62 weight percent or less. Preferably the liquid carrier is present in an amount of about 1 weight percent or greater based on the weight of the one part curable composition and the cure accelerator, more preferably about 2.0 weight percent by weight or greater and most preferably about 2.25 weight percent or greater. Preferably the liquid carrier is present in an amount of about 5 weight percent or less based on the weight of the one part curable composition and the cure accelerator, more preferably about 4 weight percent by weight or less and most preferably about 3.5 weight percent or less.

Water is present in sufficient amount, along with the liquid carrier in reactive material 80, to provide a sufficient amount of isocyanate reactive groups to react with the isocyanate groups of the isocyanate terminated prepolymer of reactive material 70 when the two parts are contacted so as to cure the composition at a reasonably rapid rate. The equivalent ratio of isocyanate reactive groups in the reactive material 80 to isocyanate groups in reactive material 70 is chosen so as to result in the desired cure rate. Preferably the equivalent ratio of isocyanate reactive groups to isocyanate groups is about 0.3:1 or greater, more preferably about 0.5:1 or greater and most preferably 0.7:1 or greater. Preferably the equivalent ratio of isocyanate reactive groups to isocyanate groups is about 2:1 or less, more preferably about 1.5:1 or less and most preferably 1.3:1 or less. Preferably water is present in an amount of about 0.1 weight percent or greater based on the weight of the reactive material 80, more preferably about 0.3 weight percent by weight or greater and most preferably about 0.5 weight percent or greater. Preferably water is present in an amount of about 10 weight percent or less based on the weight of reactive material 80, more preferably about 5 weight percent by weight or less and most preferably about 3 weight percent or less.

Generally the amount of water present in reactive material 80 is an amount of about 0.01 weight percent or greater to at most about 1 weight percent of the weight of both reactive materials 70 and 80 (i.e., total weight of the reactive materials 70 and 80). Preferably, water is present in an amount of about 0.03 weight percent by weight or greater and most preferably about 0.05 weight percent or greater to about 0.6 weight percent by weight or less and most preferably about 0.3 weight percent or less of the total weight of the reactive materials 70 and 80.

The paste further comprises a paste forming agent. A paste forming agent is a material that when mixed with water and the liquid carrier forms a paste, and preferably a homogeneous paste. Paste as used herein means mixtures of liquid carriers with any material that is capable of reversibly binding water (for example solid powdery materials) with consistency and no separation. A paste forming agent is preferably when contacted with water absorbs water and releases water when contacted with an isocyanate functional material. Exemplary paste forming agents comprise inorganic compounds that form hydrates with water, porous materials that may contain water in its pores, materials that accommodate water in nonstoichiometric amounts and have a pasty consistency or form gels. The paste forming agents may be organic or inorganic. Exemplary hydrates or aqua complexes include inorganic compounds having water bound in coordinative fashion or as water of crystallization. Examples of such hydrates are $Na_2SO_4.10H_2O$, $CaSO_4.2H_2O$, $CaSO_4.½H_2O$, $Na_2B_4O_7.10H_2O$, $MgSO_4.7H_2O$. Exemplary paste forming materials include porous materials which enclose water in cavities; for example silicates and zeolites. Particularly suitable are kieselguhr and molecular sieves. The size of the cavities is to be chosen such that they are optimum for the accommodation of water. Consequently molecular sieves with a pore size of 4 micrometers are found particularly suitable.

Exemplary paste forming materials which accommodate water in nonstoichiometric amounts and have a pasty consistency or form gels include silica gels, clays, such as montmorillonite, bentonites, hectorite or polysaccharides, such as cellulose, cellulose ethers (methyl cellulose), starch, or polyacrylic acids. Also suitable are materials which carry ionic groups. Polyurethane polymers containing carboxyl groups or sulfonic acid groups as side chains and, respectively, their salts, especially their ammonium salts are useful as paste forming materials. Preferred paste forming materials comprise clays. Preferred clays useful include kaolin, surface treated kaolin, calcined kaolin, aluminum silicates and surface treated anhydrous aluminum silicates. The clays can be used in any form which facilitates formulation of a dispensable composition. Preferably, the clay is in the form of pulverized powder, spray dried beads or finely ground particles. These paste forming materials are able to accommodate and bind water until their water uptake capacity is exhausted.

Two or more paste forming agents may be utilized in the compositions of the invention. In some embodiments one of the paste forming agents may be a thickening agent capable of thickening the paste. Exemplary thickening paste forming agents include ultrafine attapulgite, bentonite, silica and the like. The paste forming agents are used in sufficient amount to form a paste and to bind water until needed for reaction with the isocyanate functional components.

The paste forming agent is present in an amount of about 0.1 weight percent or more based on the weight of the reactive material 80 (i.e., paste in this embodiment), more preferably about 0.5 weight percent by weight or greater and most preferably about 1.5 weight percent or greater. Preferably, the paste forming agent is present in an amount of about 60 weight percent or less based on the weight of paste, more preferably about 55 weight percent by weight or less and most preferably about 50 weight percent or less.

The paste may be formulated by blending the components together using well known mixing methods known in the art.

Each of the reactive materials 70 (e.g., isocyanate terminated prepolymer) and 80 (paste) may be inserted into the first and second compartments 12 and 40 by any suitable method and the ends gathered and clipped by any suitable method such as those known in the art. These may include, for example, machinery and methods commercially available such as from Profi L-Clip GmbH, Germany.

In an illustrative embodiment, the dispensing system may be used to bond a transparent substrate to a vehicle or building. When doing so the method involves providing the two-component reactive dispensing system and unsealing an end of said system. The unsealing may be accomplished by any suitable method such as by cutting or removing the clip at one end or cutting the walls of the inner and outer compartment at a place where the clip is removed.

The reactive materials are then dispensed onto a substrate by any suitable method and apparatus such as those known in the art. For example, and surprisingly, the reactive materials may be placed in a portable sausage or gun such as available from Albion Engineering, Moorestown, N.J. or the like, wherein the dispensing system is placed within the cartridge of the sausage gun and the outlet (dispensing end) is fitted with a static mixing nozzle. Surprisingly, the portable sausage gun may be one that is merely battery powered. The static mixing nozzle may be any suitable such as those known in the art and include, for example those available from Ellsworth Adhesives, Milwaukee, Wis.

It has been found that is useful for the dispensing end of the sausage gun cartridge to have a conical shape to funnel the reactive materials from the dispensing system into the static mixing nozzle. Typically, the angle of the conical mixing end is from 3° to 30° from the end of the cartridge end.

The reactive materials are dispensed either on the transparent substrate or the vehicle or building. Preferably, the reactive materials are dispensed on the transparent substrate forming a bead, which then is contacted with the building or vehicle. The reactive materials are then allowed to cure for a sufficient time to bond the transparent substrate and vehicle or building.

EXAMPLES

Example 1

A reactive dispensing system is prepared in the configuration shown in FIGS. 1 to 3. The film that is used to make the reactive dispensing system was ECOVER foil type S available from Constantia Ebert Folien, Niederlassung der Haendler & Natermann GmbH, Alte Schmelze 26, D-65201 Wiesbaden, Germany. This film is a three-layer laminate with two outer layers (each 25 micrometers thick) of oriented polypropylene sandwiching a 15 micrometer thick aluminum foil. The diameter and length of the dispensing system is about 7.5 cm and about 33 cm respectively. The foils are thermally welded to make the tubular members with the weld widths being about 10 mm. The outer compartment has a volume that was 10 times greater than the inner compartment.

One end was sealed via clip and the outer compartment is filled with an adhesive composition comprised of an isocyanate terminated prepolymer as described by Example 4 in table 1 of PCT Application No. PCT/US13/028837 and the inner compartment is filled with a water-containing paste that is made in the same way as described in Part II Preparation in Table 1 of PCT Application No. PCT/US13/028837 but having the following components.

| Ingredient | Supplier | Weight % |
| --- | --- | --- |
| Pluracol TP440 | BASF Co. | 11.878% |
| Platinol N | BASF Co. | 19.120% |
| Voranol 232-036 | The Dow Chemical Co. | 19.000% |
| Attagel 50 | BASF Co. | 2.723% |
| Barden R (aluminum silicate) | Imerys Co. | 46.279% |
| water | | 1.000% |
| SUM | | 100.000% |

The adhesive composition had a viscosity of 655,000 centipoises and the water paste had a viscosity of 373,000 centipoises measured using an AR2000 Rheometer and continuous flow method as described above.

After being filled the reactive dispensing system is sealed at the other end with a clip. The reactive dispensing system was stored for 3 months prior to dispensing.

Prior to dispensing, the reactive dispensing system is preheated to 54° C. and then is unsealed at one end by cutting the clip off. The reactive dispensing system is inserted sealed end first into the metal cartridge the open end of a COX battery powered sausage gun The reactive dispensing system fits snuggly into the cartridge. A threaded removable dispensing end closure having a center hole (Diameter about 16 mm) that has a conical fixture that creates a cone having an angle of 5 degrees from the flat surface of the dispensing end closure is attached/placed into the open end of the cartridge enclosing the reactive dispensing system within the cartridge. A static mixing nozzle (Part number 7701823 of Nordson EFD, East Providence, R.I., USA) is screwed into the center hole.

The reactive material is dispensed by the sausage gun onto a substrate to be glued at a rate of about 425 g/min. A continuous bead was laid on a releasing paper and was then cut with a knife in 2 hours. The bead was uniform in the cross-section and fully cured under room conditions (23° C. and 50% relative humidity). After dispensing, the dispensing system was removed and inspected. It was uniformly extruded and there was no breakage or leakage.

In addition, lapshear samples were prepared according to SAE J1529 and further described as follows. A triangle bead from the sausage, approximately 6.3 mm base and 8 mm height, was applied along the width of a glass coupon (25 mm by 100 mm) primed with BETAPRIME™ 5500 glass primer, and about 6 mm away from the coupon end. A second electric coated metal coupon (25 mm by 100 mm), primed with BETASEAL™ 43533atu primer, was immediately pressed on the adhesive bead to give a final height of 6 mm for the adhesive in between. The sample was allowed to cure for 4 days under 23° C. and 50 percent relative humidity and was then pulled at a rate of 1 inch/minute (25 mm/min) with an Instron Tester. The lapshear strength was calculated at 421 psi by dividing the load (lbs) at sample break with the sample area (in²). The failure mode of tested lapshear sample was 100% cohesive failure, failing only within the adhesive bead. The reactive materials are uniformly mixed and create a good bond with the substrates being bonded. This Example is repeated multiple times with the essentially same results.

Comparative Example 1

Example 1 is repeated except that the film that is used to make the reactive dispensing system was made from high density polyethylene. The dispensing of the reactive materials is performed within an hour of creating the sealed reactive dispensing system. The results were the same as in Example 1, however, when the sealed reactive system was set aside for only a few days, the reactive material in the outer compartment 12 had cured too much to either be dispensed or when dispensed did not adequately adhere or formed a non-uniformly mixed bead with inhomogeneous bonding.

Comparative Example 2

Example 1 is repeated except that the reactive dispensing system was formed in the configuration as shown in FIGS. 1 to 3 of U.S. Pat. No. 4,221,290. When dispensing the reactive materials, it was found that a significant amount of the time the welds rupture resulting in the fouling of the sausage gun cartridge and even when the welds held the reactive materials were non-uniformly dispensed and mixed resulting in inadequate adhesion of the substrates. It is believed that the rupture of the reactive dispensing system and non-uniformity of dispensing and mixing of the reactive materials may be due to the inner compartment crinkling at the weld line where sharp angles are formed with the outer compartment.

Comparative Example 3

Example 1 is repeated except that the reactive dispensing system was formed in the configuration as shown in FIGS. 1 to 3 of U.S. Pat. No. 4,227,612. When dispensing the reactive materials, it was found that a significant amount of the time the welds rupture resulting in the fouling of the sausage gun cartridge and even when the welds held the reactive materials were non-uniformly dispensed and mixed resulting in inadequate adhesion of the substrates. It is believed that the rupture of the reactive dispensing system and non-uniformity of dispensing and mixing of the reactive materials may be due to the inner compartment crinkling at the weld line where sharp angles are formed with the outer compartment.

Comparative Example 4

Figure 4:
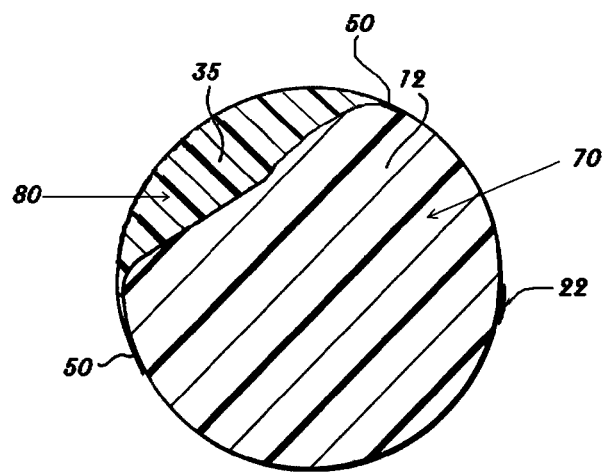
FIG. 4 is a cross-sectional depiction of a two-component reactive dispensing system not of this invention.

Example 1 is repeated except that the reactive dispensing system was formed in the configuration as shown in FIG. 4, wherein the second compartment is formed from a foil welded at two points on the same surface of the foil. When dispensing the reactive materials, it was found that a significant amount of the time the welds rupture resulting in the fouling of the sausage gun cartridge and even when the welds held the reactive materials were non-uniformly dispensed and mixed resulting in inadequate adhesion of the substrates. It is believed that the rupture of the reactive dispensing system and non-uniformity of dispensing and mixing of the reactive materials may be due to the inner compartment crinkling at the weld line where sharp angles are formed with the outer compartment.

The invention claimed is:

1. A two-component reactive dispensing system comprising,
   (i) a first tubular member having walls comprised of a pliable film in which the walls define a first compartment having an inner wall surface, outer wall surface, two ends, longitudinal axis and cross-sectional area and
   (ii) a second tubular member having walls comprised of a pliable film in which the walls define a second compartment having an inner wall surface, outer wall surface, longitudinal axis, two ends, and cross-sectional area, wherein the second tubular member is disposed within the first tubular member along the longitudinal axis of each, and a portion of the outer wall surface of the second tubular member is bonded to a portion of the inner wall surface of the first tubular member along the longitudinal axis, thereby forming a bond line adhering the first and second tubular members,
   wherein the first tubular member has a first tubular member forming bond along its longitudinal axis and the second tubular member has a second tubular member forming bond along its longitudinal axis such that the portion of the outer wall surface of the second tubular member bonded to the portion of the inner wall surface of the first tubular member do not coincide with either the first or second tubular member forming bonds;
   wherein the bond line adhering the first and second tubular members is displaced no more than 30 degrees from 180 degrees from the first and second tubular member forming bonds, and
   (iii) the first and second compartments being filled with differing reactive materials that react with each other and at least one of the reactive materials reacts with water and the first and second compartments are cooperatively gathered and sealed at each end.

2. The improved two-component reactive dispensing system of claim 1, wherein the pliable film of the first and second tubular member is impermeable to water.

3. The two-component reactive dispensing system of claim 2, wherein the pliable film is a laminate comprised of three layers with two outer layers sandwiching an inner layer, the outer layers comprised of a thermoplastic polymer and the inner layer comprised of a metal that is essentially impermeable to water vapor.

4. The two-component reactive dispensing system of claim 3, wherein the outer layers are biaxially oriented polypropylene and the inner layer is aluminum.

5. The two-component reactive dispensing system of claim 4, wherein the biaxially oriented polypropylene has a direction of highest and lowest strength and the direction having the highest strength is oriented parallel with the longitudinal axis of the first and second tubular members.

6. The two-component reactive dispensing system of claim 1, wherein the second tubular member is bonded to the first tubular member by an adhesive or fusion of the pliable films of the first and second tubular members.

7. The two-component reactive dispensing system of claim 6, wherein the second tubular member is bonded to the first tubular member by fusion of the pliable films of the first and second tubular members.

8. The two-component reactive dispensing system of claim 7, wherein the portion of the outer wall surface of the second tubular member is bonded to a portion of the inner wall surface of the first tubular member along the longitudinal axis such that the bonded portion has a width of at least 5 mm to 15 mm so long as the width is at most 10% of the periphery of the first tubular member.

9. The two-component reactive dispensing system of claim 1, wherein one of the reactive materials is an adhesive composition having an isocyanate terminated prepolymer.

10. The two-component reactive dispensing system of claim 9, wherein the other reactive material is comprised of water.

11. The two-component reactive dispensing system of claim 9, wherein the adhesive composition has a viscosity of 20,000 centipoise to 2,000,000 centipoise.

12. The two-component reactive dispensing system of claim 11, wherein the other reactive material has a viscosity that is 10,000 centipoise to 1,500,000 centipoise.

13. The two-component reactive dispensing system of claim 12, wherein the other reactive material further comprises fillers and polyols.

14. The two-component reactive dispensing system of claim 13, wherein the adhesive composition is further comprised of fillers and plasticizers.

15. A method of adhering a transparent substrate into a building or vehicle comprising,
   (a) providing the two-component reactive dispensing system of claim 1,
   (b) unsealing one end of the two-component reactive system,
   (c) dispensing the reactive materials of the two-component system onto the transparent substrate to form a bead of the reactive materials on the transparent substrate,
   (d) contacting the transparent substrate with the building or vehicle such that the adhesive bead is therebetween and in contact with the transparent substrate and the building or vehicle, and
   (e) allowing the reactive materials to react and adhere the transparent substrate to the building or vehicle.

16. The method of claim 15, wherein the dispensing is performed using a portable sausage gun.

17. The method claim 15, wherein one of the reactive materials is an adhesive composition having an isocyanate terminated prepolymer and the other reactive material is comprised of water.

18. The method of claim 15, wherein the dispensing is performed using a sausage caulking gun having a conical dispensing end where the reactive materials are dispensed such that the conical dispensing end funnels the reactive materials through a static mixer nozzle.

19. The method of claim 18, wherein the conical dispensing end has an angle of 3° to 30°.

* * * * *

UNITED STATES PATENT AND TRADEMARK OFFICE
CERTIFICATE OF CORRECTION

PATENT NO. : 9,821,512 B2
APPLICATION NO. : 15/113923
DATED : November 21, 2017
INVENTOR(S) : Huide D. Zhu et al.

Page 1 of 1

It is certified that error appears in the above-identified patent and that said Letters Patent is hereby corrected as shown below:

On the Title Page

PCT Filed date, replace "March 25, 2015" with --March 26, 2015--

Signed and Sealed this
Twentieth Day of February, 2018

Andrei Iancu
*Director of the United States Patent and Trademark Office*